(12) United States Patent
Liu et al.

(10) Patent No.: US 9,831,770 B2
(45) Date of Patent: Nov. 28, 2017

(54) BOOST REGULATOR WITH REDUCED INDUCTOR CURRENT NOISE

(71) Applicant: HITACHI AUTOMOTIVE SYSTEMS, LTD., Hitachinaka-shi, Ibaraki (JP)

(72) Inventors: Ming Liu, Tokyo (JP); Kenichi Osada, Tokyo (JP); Takuya Mayuzumi, Ibaraki (JP); Mitsuhiko Watanabe, Ibaraki (JP); Goichi Ono, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/500,728

(22) PCT Filed: Jun. 23, 2015

(86) PCT No.: PCT/JP2015/067972
§ 371 (c)(1),
(2) Date: Jan. 31, 2017

(87) PCT Pub. No.: WO2016/035425
PCT Pub. Date: Mar. 10, 2016

(65) Prior Publication Data
US 2017/0222551 A1 Aug. 3, 2017

(30) Foreign Application Priority Data

Sep. 2, 2014 (JP) .................................. 2014-178079

(51) Int. Cl.
*H02M 3/156* (2006.01)
*H02M 1/08* (2006.01)
(Continued)

(52) U.S. Cl.
CPC ............. *H02M 3/156* (2013.01); *H02M 1/08* (2013.01); *H02M 1/44* (2013.01); *H02M 2001/0009* (2013.01)

(58) Field of Classification Search
CPC ...................................................... H02M 3/156
(Continued)

(56) References Cited

U.S. PATENT DOCUMENTS 6,366,070 B1 * 4/2002 Cooke ................. H02M 3/1588
323/222
9,621,036 B2 * 4/2017 Wibben ................ H02M 3/156
(Continued)

FOREIGN PATENT DOCUMENTS

JP 2009-296721 A 12/2009
JP 2010-207063 A 9/2010
(Continued)

*Primary Examiner* — Jeffrey Sterrett
(74) *Attorney, Agent, or Firm* — Miles & Stockbridge P.C.

(57) ABSTRACT

Downsizing of an inductor is achieved while reducing radiation noise of an inductor current. A boosting power supply unit is, for example, provided in an ECU mounted in a vehicle or the like. The boosting power supply unit has a boosting coil, a switching element and a current control unit 16. The current control unit 16 controls the switching element 12 to turn on and off by using a clock signal CK1 with a higher frequency than a pulse signal SPL in a clamping period when the inductor current flowing in the boosting coil is clamped at a preset peak setting current, and controls the switching element to turn on and off by using the pulse signal SPL in periods other than the clamping period. By controlling the switching element to turn on and off in this manner, the inductor current flowing in the boosting coil is controlled.

14 Claims, 10 Drawing Sheets

(51) Int. Cl.
*H02M 1/44* (2007.01)
*H02M 1/00* (2006.01)

(58) Field of Classification Search
USPC .......................................... 323/222, 282, 284
See application file for complete search history.

(56) References Cited

U.S. PATENT DOCUMENTS

| | | |
|---|---|---|
| 2010/0225286 A1 | 9/2010 | Osaka |
| 2010/0242920 A1 | 9/2010 | Omori et al. |
| 2012/0139514 A1* | 6/2012 | Paatero ................ H02M 3/156 323/282 |
| 2012/0223691 A1* | 9/2012 | Weinstein .............. H02M 1/44 323/283 |
| 2014/0203726 A1 | 7/2014 | Katsura |
| 2016/0345395 A1* | 11/2016 | Chen .................. H05B 33/0815 |
| 2017/0222551 A1* | 8/2017 | Liu ....................... H02M 3/156 |

FOREIGN PATENT DOCUMENTS

| | | |
|---|---|---|
| JP | 2010-229877 A | 10/2010 |
| JP | 2014-143235 A | 8/2014 |

\* cited by examiner

BOOST REGULATOR WITH REDUCED INDUCTOR CURRENT NOISE

TECHNICAL FIELD

The present invention relates to a power supply unit and, particularly to a technology effective for a boosting power supply unit which generates a high voltage supplied to an onboard injector and the like.

BACKGROUND ART

In vehicles and the like, various electronic control devices, so called engine control units (ECUs), which control an engine, electronic apparatuses and the like, are mounted. For example, in an ECU controlling an injector which performs fuel injection to a combustion chamber, a boosting power supply unit, which supplies a boosting power supply to the injector, is mounted. The boosting power supply unit generates a boosting power supply which boosts a power supply voltage supplied from a battery mounted in a vehicle to operate the injector.

In this type of boosting power supply unit, for example, a boosting coil, which boosts, by switching operation of a switching element, a power supply voltage supplied from a battery, is provided. The boosting coil produces a high output voltage by energy accumulated in the boosting coil through the conduction of the switching element.

Moreover, in the boosting power supply unit, for example, a constant current control system or the like controls the output voltage to be generated. This constant current control system performs on and off operation of the switching element so that an average current value of an inductor current flowing in the boosting coil becomes a preset current setting value.

Note that a voltage control technology by this type of boosting power supply unit has been known, in which a current detecting means collectively detects a current flowing in each converter, and a drive cancelling means cancels only driving signals in a longer driving state when a plurality of converters among converters are in a driving state, thereby performing stable overcurrent operations (e.g., refer to PTL 1).

CITATION LIST

Patent Literature

PTL 1: JP 2010-207063 A

SUMMARY OF INVENTION

Technical Problem

In recent years, area reduction of a circuit is strictly required to achieve downsizing and the like in ECUs. Thus, the downsizing of a boosting coil, that is, an inductor, which occupies a large area in a circuit, is highly strongly required in the ECU in which the boosting power supply unit is mounted.

Herein, two following technologies are considered for the area reduction of the inductor, that is, the downsizing of the inductor.

One is to reduce inductance of the inductor, and the other is to decrease a current flowing in the inductor.

On the other hand, in view of electromagnetic compatibility (EMC), radiation noise released from the boosting power supply unit and the like is required to meet the specifications in the ECUs.

To reduce the radiation noise in the boosting power supply unit, for example, decreasing a switching frequency of a switch element is considered. This can reduce the radiation noise of the inductor current flowing in the boosting coil.

However, when the switching frequency is reduced, on time and off time of the switching element must be longer to set an average current value of the inductor current to the aforementioned set current value. As the on time of the switching elements becomes longer, a peak current value of the inductor current flowing in the boosting coil becomes larger accordingly.

As the peak current value of the inductor current increases, an inductor with tolerability suitable for the current value is required. As a result, there is a problem that the size of the boosting coil increases.

Moreover, the peak current value of the inductor current can be reduced by increasing the switching frequency of the switching element. However, increasing the switching frequency causes high speed operation of the switching element, and radiation noise of the inductor current increases. Thus, there is a risk that the required specifications may not be met.

An object of the present invention is to provide a technology which can achieve the downsizing of the inductor while reducing the radiation noise in the inductor current.

The aforementioned and other objects and novel features of the present invention will be apparent from the description in the specification and the accompanying drawings.

Solution to Problem

The summary of the representative of the invention disclosed in the application will be briefly described below.

That is, the representative boosting power supply unit has a switching element, a boosting coil and a current control unit. The switching element is connected in parallel to a direct current power supply. The boosting coil boosts the direct current power supply by switching operation of the switching element. The current control unit controls the switching element to turn on and off by a first switching signal and a second switching signal, which has a higher frequency than the first switching signal, thereby controlling an inductor current flowing in the boosting coil.

Moreover, the current control unit controls the switching element to turn on and off by using the second switching signal in a clamping period when the inductor current flowing in the boosting coil is clamped at a preset peak setting current. The current control unit controls the switching element to turn on and off by using the first switching signal in periods other than the clamping period.

More specifically, the current control has a first signal generating unit, a second signal generating unit, a selector and a switch control unit. The first signal generating unit generates the first switching signal. The second signal generating unit generates the second switching signal. Based on a pulse switching signal, the selector outputs either the first switching signal generated by the first signal generating unit or the second switching signal generated by the second signal generating unit to the switching element. The switch control unit generates the pulse switching signal outputted to the selector.

Advantageous Effects of Invention

The effects obtained by the representative of the invention disclosed in the application will be briefly described below.

The downsizing of the boosting power supply unit can be achieved while reducing the radiation noise.

DESCRIPTION OF EMBODIMENTS

In the following embodiments, a description will be made in a plurality of divided sections or embodiments for convenience, if necessary. However, unless clearly stated in particular, these are not irrelevant from each other, but these are in a relationship where one is part or all of the modifications details, supplementary explanations and the like in the others.

Moreover, in the following embodiments, when referring to the number of elements and the like (including quantities, numerical values, amounts, ranges and the like), these are not limited to the specified numbers and may be more or less than or equal to the specified numbers unless clearly stated in particular, obviously limited to the specified numbers in principle, and the like.

Furthermore, in the following embodiments, it is needless to say that the components (including element steps and the like) are not necessarily required unless clearly stated in particular, considered to be obviously required in principle, and the like.

Similarly, in the following embodiments, when referring to shapes, positional relationships, and the like of the components and the like, shapes and the like which are substantially approximate or similar to those are included unless clearly stated in particular, obviously not considered in principle, and the like. This applies similarly to the above numerical values and ranges. Moreover, in all the drawings for illustrating the embodiments, the same signs are generally given to the same members, and their redundant descriptions are omitted.

Embodiment 1

A detailed description of the embodiment will be made below.

<Configuration Example of Boosting Power Supply Unit>

Figure 1:
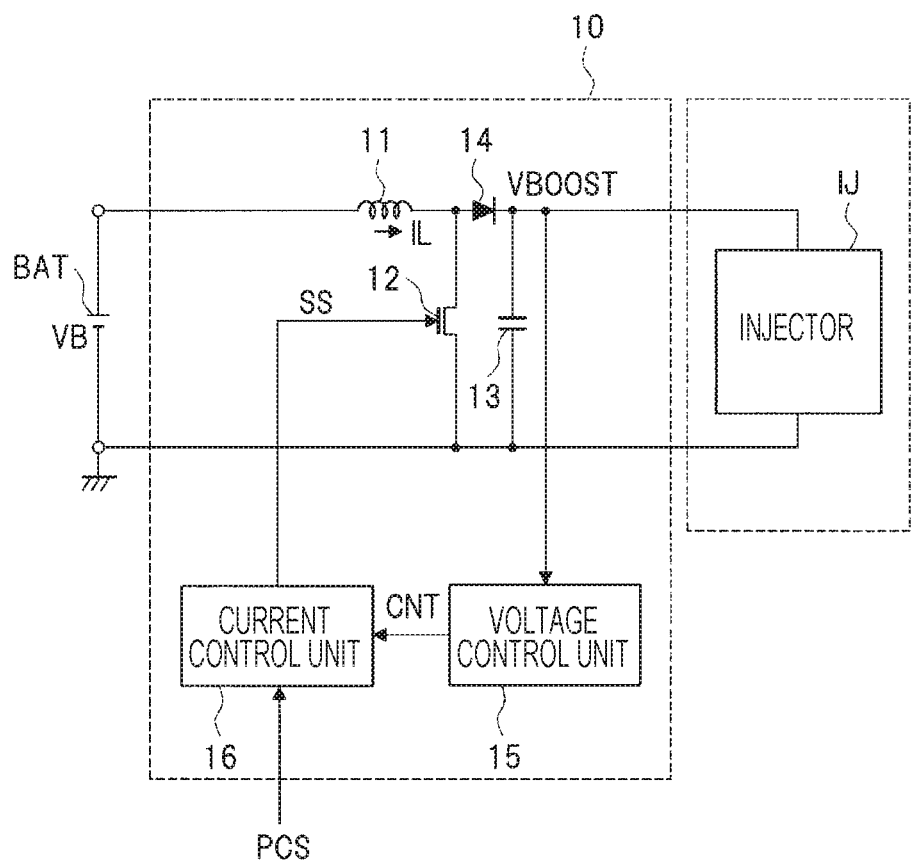
FIG. 1 is an explanatory drawing showing one example of the configuration of a boosting power supply unit according to Embodiment 1.

FIG. 1 is an explanatory drawing showing one example of the configuration of a boosting power supply unit 10 according to Embodiment 1.

The boosting power supply unit 10 is, for example, a power supply unit mounted in an ECU mounted in a vehicle. In this case, the ECU is responsible for, for example, the control of an injector. The injector is a fuel injection device which injects fuel to a combustion chamber. Note that, herein, although the injector is mentioned as an example of a load, a load to which the boosting power supply unit 10 supplies power supply is not limited to this. In the boosting power supply unit 10, various electrical components which require a boosting power supply with a higher voltage than a battery BAT as an operation power supply may be served as loads.

The boosting power supply unit 10 generates a high voltage power supply VBOOST, which is supplied to the injector, a load, from a power supply VB of the battery BAT mounted in a vehicle. As shown in FIG. 1, the boosting power supply unit 10 has a boosting coil 11, a switching element 12, a capacitor 13, a diode 14, a voltage control unit 15 and a current control unit 16.

One end of the boosting coil 11 is connected to, for example, a positive (+) terminal of the battery BAT mounted in a vehicle or the like. The other end of the boosting coil 11 is connected to each of an anode of the diode 14 and one end of the switching element 12. The switching element 12 is composed of, for example, an N channel metal oxide semiconductor (MOS) transistor.

A cathode of the diode 14 is connected to one end of the capacitor 13. A connection node between this diode 14 and the capacitor 13 becomes an output part of the boosting power supply unit 10 and outputs the high voltage power supply VBOOST. Herein, a voltage value of the high voltage power supply VBOOST generated by the boosting power supply unit 10 is, for example, about 65 V.

The high voltage power supply VBOOST is supplied as an operation power supply of the injector IJ, a load. The negative (−) terminal of the battery BAT is connected to each of the other end of the switching element 12 and the other end of the capacitor 13.

The voltage control unit 15 monitors a voltage level of the high voltage power supply VBOOST outputted from the boosting power supply unit 10 and controls the current control unit 16 so that the high voltage power supply VBOOST becomes a desired voltage.

A signal output part of the current control unit 16 is connected to a control terminal of the switching element 12. The current control unit 16 outputs a switching signal from the signal output part to control on and off operation of the switching element 12, thereby controlling an average current Ia, which is an average value of an inductor current IL flowing in the boosting coil 11, to become a predetermined current value.

Next, the operations of the boosting power supply unit 10 will be described.

The voltage control unit 15 outputs a control signal CNT, which starts the operation of the current control unit 16, when a voltage value of the high voltage power supply VBOOST outputted from the boosting power supply unit 10 becomes lower than a preset threshold value.

The current control unit 16 outputs a switching signal SS after receiving the control signal CNT outputted from the voltage control unit 15. When the switching element 12 turns on by this switching signal SS, a current flows in the boosting coil 11. Moreover, when the switching element 12 turns off, a high output voltage, that is, the high voltage power supply VBOOST is generated at both ends of the capacitor 13 by energy accumulated in the boosting coil 11 through the conduction.

The voltage control unit 15 outputs the control signal CNT to stop the operation of the current control unit 16 when a voltage value of the high voltage power supply VBOOST becomes higher than a preset threshold value voltage.

<Configuration Example of Current Control Unit>

Figure 2:
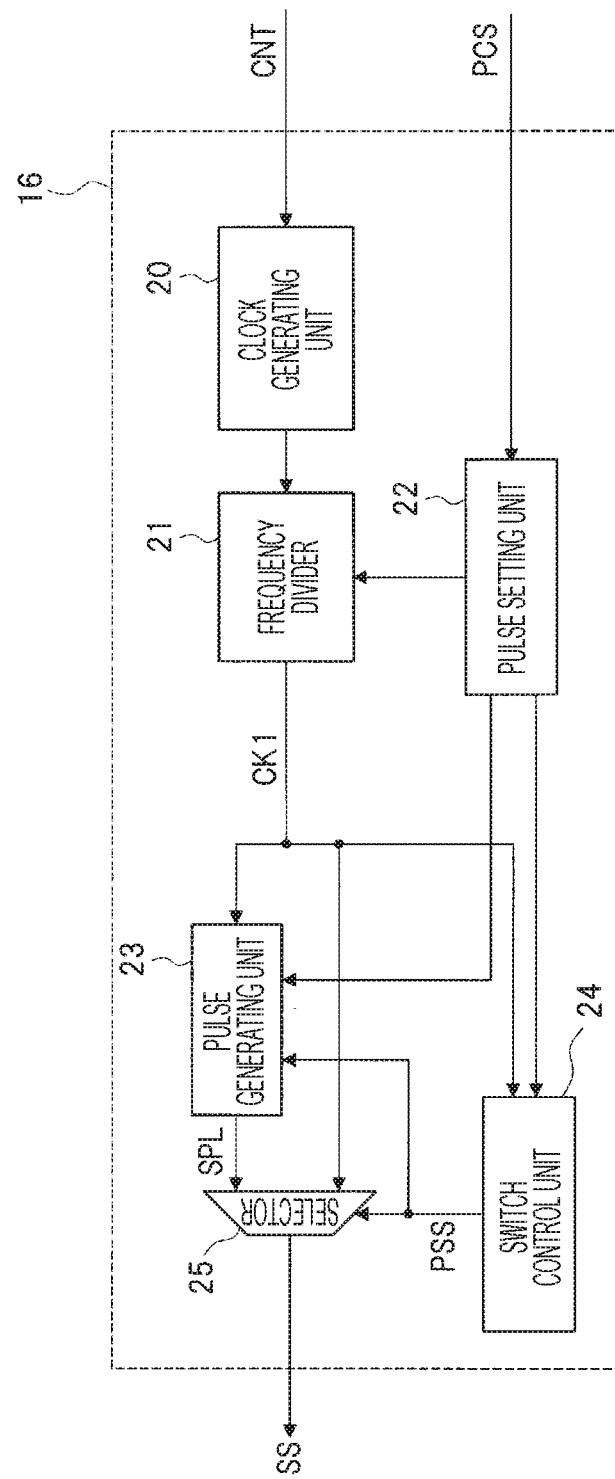
FIG. 2 is an explanatory drawing showing one example of the configuration of the current control unit provided in the boosting power supply unit of FIG. 1.

FIG. 2 is an explanatory drawing showing one example of the configuration of the current control unit 16 provided in the boosting power supply unit 10 of FIG. 1.

As shown in FIG. 2, the current control unit 16 has a clock generating unit 20, a frequency divider 21, a pulse setting unit 22, a pulse generating unit 23, a switch control unit 24 and a selector 25. The clock generating unit 20 generates a basic clock based on the control signal CNT outputted from the voltage control unit 15 of FIG. 1.

The frequency divider 21, a second signal generating unit, outputs a clock signal CK1 obtained by performing frequency division on the basic clock generated by the clock generating unit 20. The pulse generating unit 23, a first signal generating unit, generates a pulse signal SPL based on a basic clock, which is the clock signal CK1 generated by the frequency divider 21. The clock signal CK1 becomes a second switching signal, and the pulse signal SPL becomes a first switching signal.

The switch control unit 24 outputs a pulse switching signal PSS at each cycle set by the pulse setting unit 22. When the clock signal CK1 generated by the frequency divider 21 is inputted to the switch control unit 24 and reaches a set cycle, the switch control unit 24 outputs the pulse switching signal PSS in synchronization with signal rising of the clock signal CK1.

To the selector 25, each of the clock signal CK1 and the pulse signal SPL, which are generated by the frequency divider 21 and the pulse generating unit 23 respectively, is inputted. The selector 25 selects and outputs the clock signal CK1 or the pulse signal SPL based on the pulse switching signal PSS outputted from the switch control unit 24.

Either the clock signal CK1 or the pulse signal SPL outputted from this selector 25 becomes a switching signal SS inputted to the control terminal of the switching element 12 of FIG. 1. For example, the clock signal CK1 is outputted as the switching signal SS when the pulse switching signal PSS outputted from the switch control unit 24 becomes a high signal (Hi), and the pulse signal SPL is outputted as the switching signal SS when the pulse switching signal PSS becomes a low signal (Lo).

The clock signal CK1 clamps the inductor current flowing in the boosting coil 11 at a current value about a set peak setting current. The peak setting current sets the maximum value of the inductor current flowing in the boosting coil 11.

The pulse setting unit 22 sets frequencies, duty ratios and the like of the clock signal CK1 and the pulse signal SPL based on a pulse setting control signal PCS. Moreover, the pulse setting unit 22 sets timing and the like of the pulse switching signal PSS of the switch control unit 24 based on the pulse setting control signal PCS. Note that output intervals, output period and the like may be set instead of setting the frequencies and the duty ratios since the pulse signal SPL is a single pulse.

The pulse setting control signal PCS is outputted from, for example, a CPU (not shown) provided in an ECU. The frequencies and the duty ratios of the clock signal CK1 and the pulse signal SPL, the timing of the pulse switching signal PSS of the switch control unit 24, and the like can be variously set by this pulse setting control signal PCS.

By making the pulse setting control signal PCS an external input (herein, the CPU provided in the ECU) in this manner, the frequencies and the duty ratios of the clock signal CK1 and the pulse signal SPL, the timing of the pulse switching signal PSS by the switch control unit 24, and the like can be easily and flexibly changed.

This is particularly effective when an inductance value of the boosting coil 11 of the boosting power supply unit 10 is changed and the like. For example, when a load is changed, a voltage level of a high voltage power supply generated by a boosting power supply unit may be changed in accordance with the load, and the inductance value of the boosting coil 11 may be changed. Even in this case, the peak setting current and the average current suitable for the inductance value of the boosting coil can be easily set by the CPU.

<Operation Example of Current Control Unit>

Figure 3:
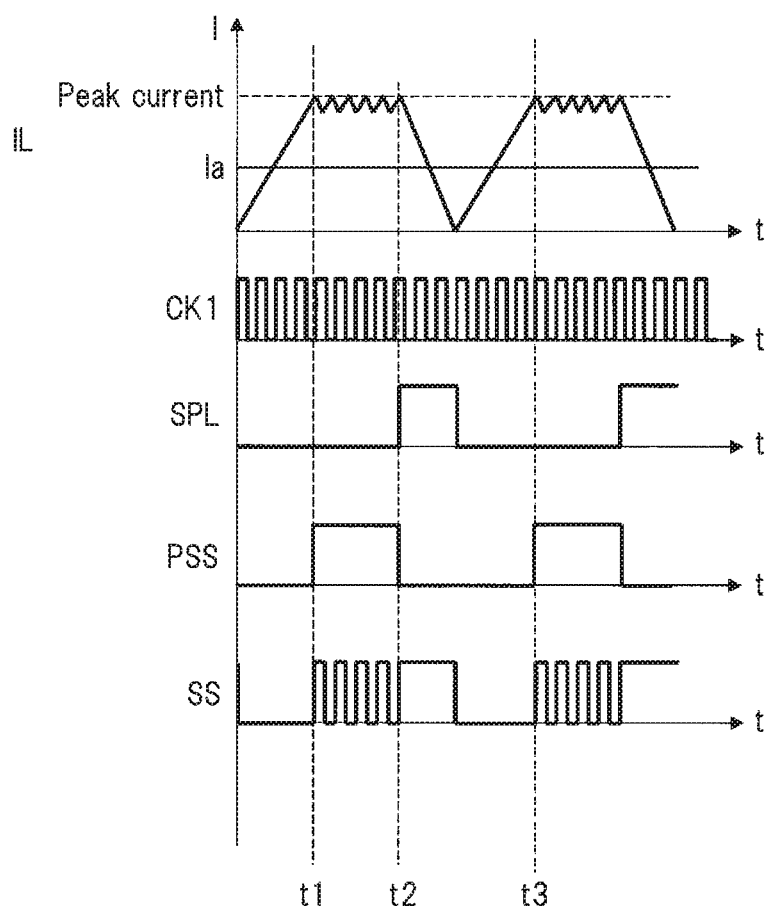
FIG. 3 is an explanatory drawing of signal timings showing one example of the operations in the current control unit of FIG. 2.

FIG. 3 is an explanatory drawing of signal timings showing one example of the operations in the current control unit 16 of FIG. 2.

From the top to the bottom, FIG. 3 severally shows the inductor current IL flowing in the boosting coil 11 provided in the boosting power supply unit 10 of FIG. 1, and signal timings of the clock signal CK1 outputted from the frequency divider 21, the pulse signal SPL outputted from the pulse generating unit 23, the pulse switching signal PSS outputted from the switch control unit 24, and the switching signal SS outputted from the current control unit 16.

When the control signal CNT is inputted, the clock generating unit 20 generates the basic clock. The frequency divider 21 generates the clock signal CK1 with a frequency and a duty ratio set by the pulse setting unit 22 from the basic clock generated by the clock generating unit 20.

First, the pulse switching signal PSS of a low signal is outputted from the switch control unit 24. This makes the selector 25 output the pulse signal SPL, generated by the pulse generating unit 23, as the switching signal SS.

In FIG. 3, a low signal is outputted as the switching signal SS since the pulse signal SPL is not outputted. When the switching signal SS is a low signal, the switching element 12 of FIG. 1 turns off, and thus the inductor current IL rises.

Then, when a period set by the pulse setting unit 22 elapses, that is, when the inductor current IL rises to a preset peak setting current, the switch control unit 24 outputs the pulse switching signal PSS of a high signal at time t1. Herein, the peak setting current is a preset peak current flowing in the boosting coil 11. This makes the selector 25 output the clock signal CK1, generated by the frequency divider 21, as the switching signal SS.

The clock signal CK1 is set to a frequency high enough to make an amplitude of the inductor current IL small, and rise and fall of the inductor current IL are repeated in short cycles. As a result, the inductor current IL is clamped at around the peak setting current. As previously described, the frequency and the duty ratio of the clock signal CK1 generated by the frequency divider 21 are set by the pulse setting unit 22.

Then, after the inductor current IL is clamped at around the peak setting current, the switch control unit 24 outputs the pulse switching signal PSS of a low signal again at time t3. At this time, one shot pulse is outputted from the pulse generating unit 23.

This makes the one shot pulse of a high signal, generated by the pulse generating unit 23, outputted from the selector 25 as the switching signal SS. By this switching signal SS, the switching element 12 turns on, and the inductor current IL decreases.

Herein, the output cycle of the pulse signal SPL outputted by the pulse generating unit 23 and the output period of the high signal are also set by the pulse setting unit 22 as previously described.

By repeating the above operations, the current control unit 16 outputs the switching signal SS to the switching element 12.

The frequency and the duty ratio of the clock signal CK1 and the output cycle and period of the pulse signal SPL are set so that the average current Ia of the inductor current IL becomes a preset current value. In other words, the set average current Ia is a value which meets the specifications of the output current of the boosting power supply unit 10.

<Configuration Example and Operations of Boosting Power Supply Unit 50 Considered by the Inventors>

Figure 4:
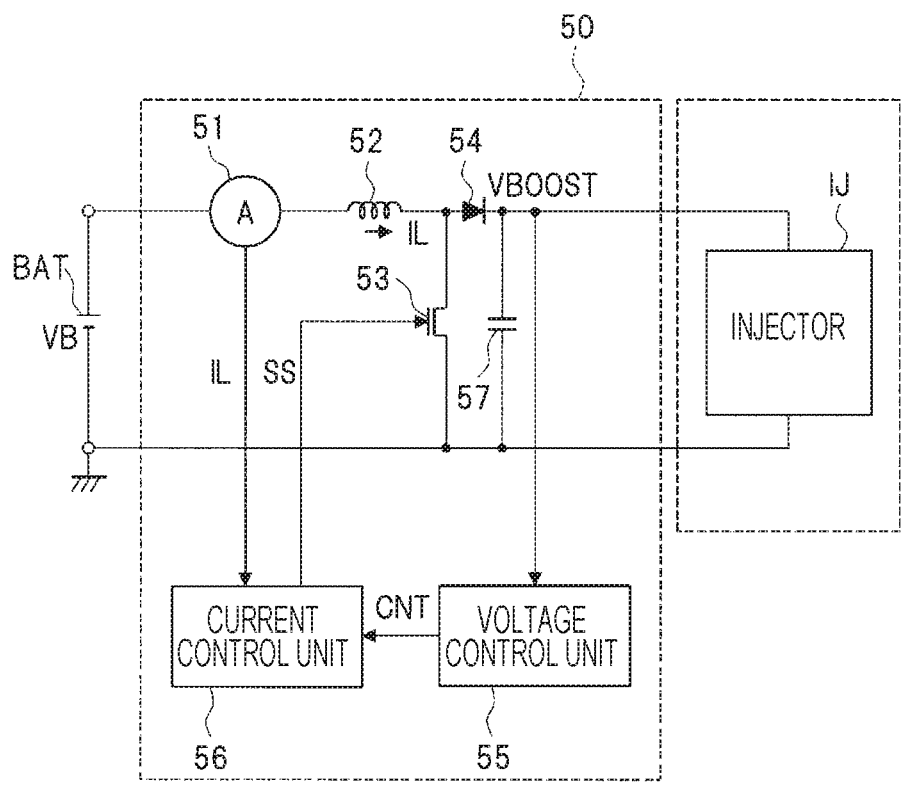
FIG. 4 is an explanatory drawing showing a configuration example of a boosting power supply unit with a constant current control system considered by the inventors.

FIG. 4 is an explanatory drawing showing a configuration example of a boosting power supply unit 50 with a constant current control system considered by the inventors.

As shown in the drawing, the boosting power supply unit 50 is configured by a current sensing circuit 51, a boosting coil 52, a switching element 53, a diode 54, a voltage control unit 55, a current control unit 56 and a capacitor 57.

A description of the boosting operations by turning the switching element 53 on and off will be omitted since they are the same as the ones described in FIG. 1. The current sensing circuit 51 measures an inductor current IL flowing in the boosting coil 52. The inductor current IL measured by this current sensing circuit 51 is inputted to the current control unit 56.

The current control unit 56 generates a switching signal SS based on the inductor current IL measured by the current sensing circuit 51 to control on and off operation of the switching element 53 so that an average current Ia of the inductor current IL becomes a preset predetermined current value.

Figure 5:
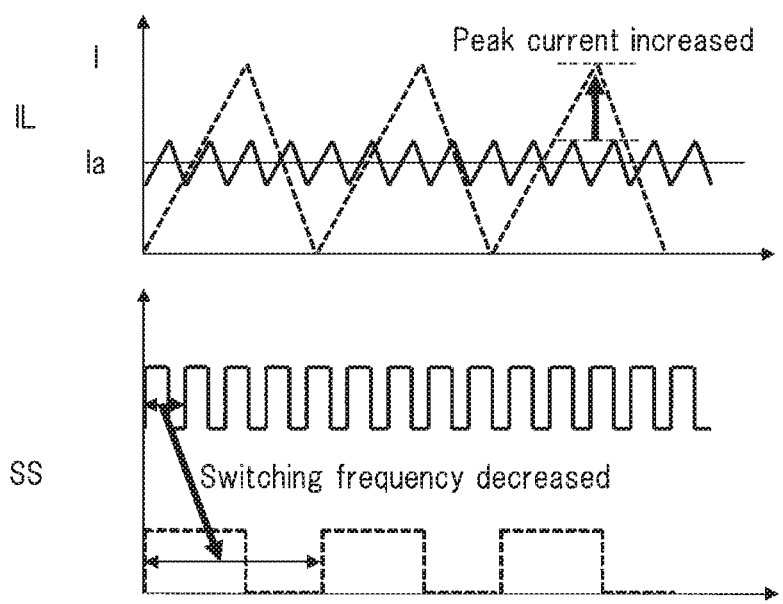
FIG. 5 is a timing chart showing one example of inductor currents and signal waveforms of switching signals in the boosting power supply unit of FIG. 4.

FIG. 5 is a timing chart showing one example of the inductor current IL and signal waveforms of the switching signals SS in the boosting power supply unit 50 of FIG. 4.

In FIG. 5, the inductor current IL is shown in the top, and the signal waveforms of the switching signals SS outputted from the current control unit 56 are shown in the bottom. Moreover, the solid line and the dotted line of the switching signals of FIG. 5 indicate the switching signals with different frequencies. As can be understood from the drawing, the switching signal SS of the solid line has a higher frequency than the switching signal of the dotted line.

Moreover, the solid line of the inductor current IL indicates a waveform of the inductor current when the switching element 53 is operated by the switching signal SS of the solid line. The dotted line of the inductor current IL indicates a waveform of the inductor current when the switching element 53 is operated by the switching signal SS of the dotted line. Average currents Ia of the inductor currents IL by the switching signal of the solid line with higher frequency and the switching signal of the dotted line are almost the same. The average current Ia is set to a value which meets the specifications of the output current of the boosting power supply unit 10.

In FIG. 5, when the switching element 53 is driven by the switching signal SS of the dotted line with a lower frequency, the amplitude of the inductor current IL indicated by the dotted line becomes large. As a result, the peak current thereof becomes larger than that of the inductor current IL indicated by the solid line.

In this case, the switching frequency of the switching element 53 can be decreased, and thus radiation noise of the inductor current can be reduced. However, the peak current of the inductor current IL increases, and the boosting coil 52 having a tolerance suitable for this current value must be prepared. This increases the size of the boosting coil 52 as well as the costs.

By contrast, when the switching element 53 is driven by the switching signal of the solid line with a higher frequency than the switching signal SS of the dotted line, the amplitude of the inductor current IL indicated by the dotted line can be reduced. As a result, the boosting coil 52 can be downsized, and the costs can also be reduced.

However, when the switching frequency is high, radiation noise of the inductor current increases. This may cause a risk of not meeting the noise specifications required by automobile manufacturers and the like.

On the other hand, in the boosting power supply unit 10 shown in FIG. 1, as shown in FIG. 3, the selector 25 outputs the clock signal CK1, generated by the frequency divider 21, as the switching signal SS when the period set by the pulse setting unit 22 elapses and the inductor current IL becomes a preset current value or more. As a result, the inductor current IL is clamped at a current value about the preset peak setting current.

This can decrease the frequency of the switching signal SS while reducing the peak current of the inductor current IL.

Therefore, it is possible to achieve the boosting power supply unit 10, in which the radiation noise can be reduced while the downsizing of the boosting coil 11 is achieved. This can downsize the ECUs and reduce the costs as well as improve the reliability of the ECUs.

Embodiment 2

<Configuration Example of Boosting Power Supply Unit>

Figure 6:
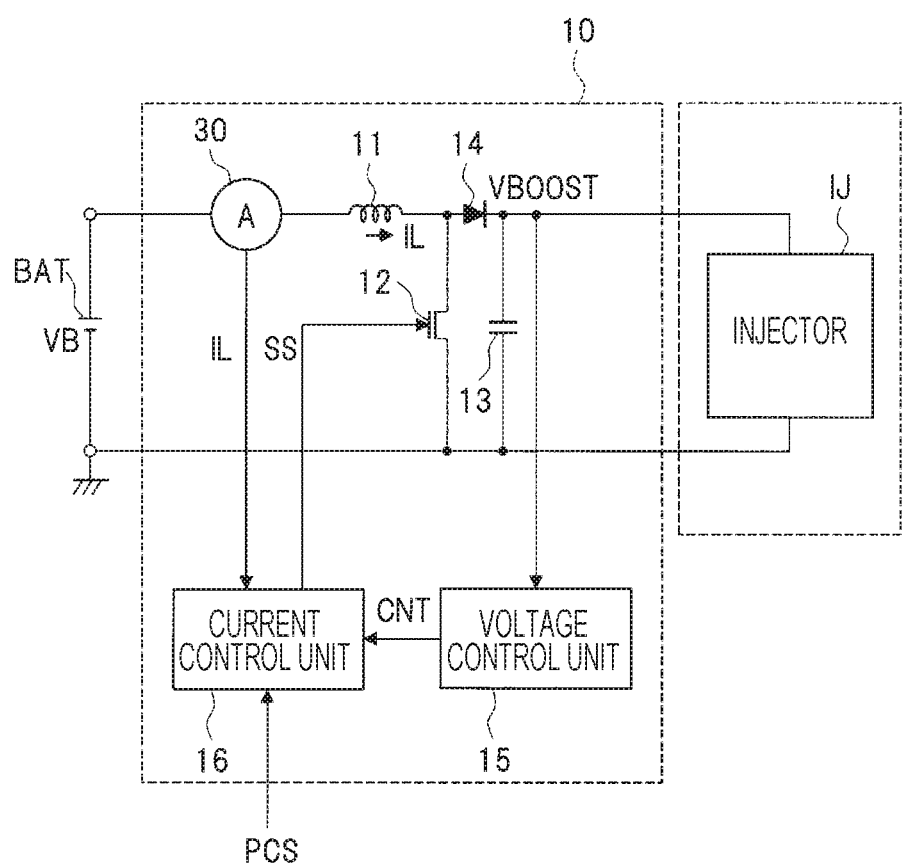
FIG. 6 is an explanatory drawing showing one example of the configuration of a boosting power supply unit according to Embodiment 2.

FIG. 6 is an explanatory drawing showing one example of the configuration of a boosting power supply unit 10 according to Embodiment 2.

A current sensing circuit 30 is newly provided to the boosting power supply unit 10 of FIG. 6, which is different from the boosting power supply unit 10 of the aforementioned Embodiment 1. The current sensing circuit 30, a current measuring unit, measures an inductor current IL flowing in a boosting coil 11 and outputs this measured result to a current control unit 16. Other connection configurations are the same as those in FIG. 1. Thus, the descriptions thereof will be omitted.

<Configuration Example of Current Control Unit>

Figure 7:
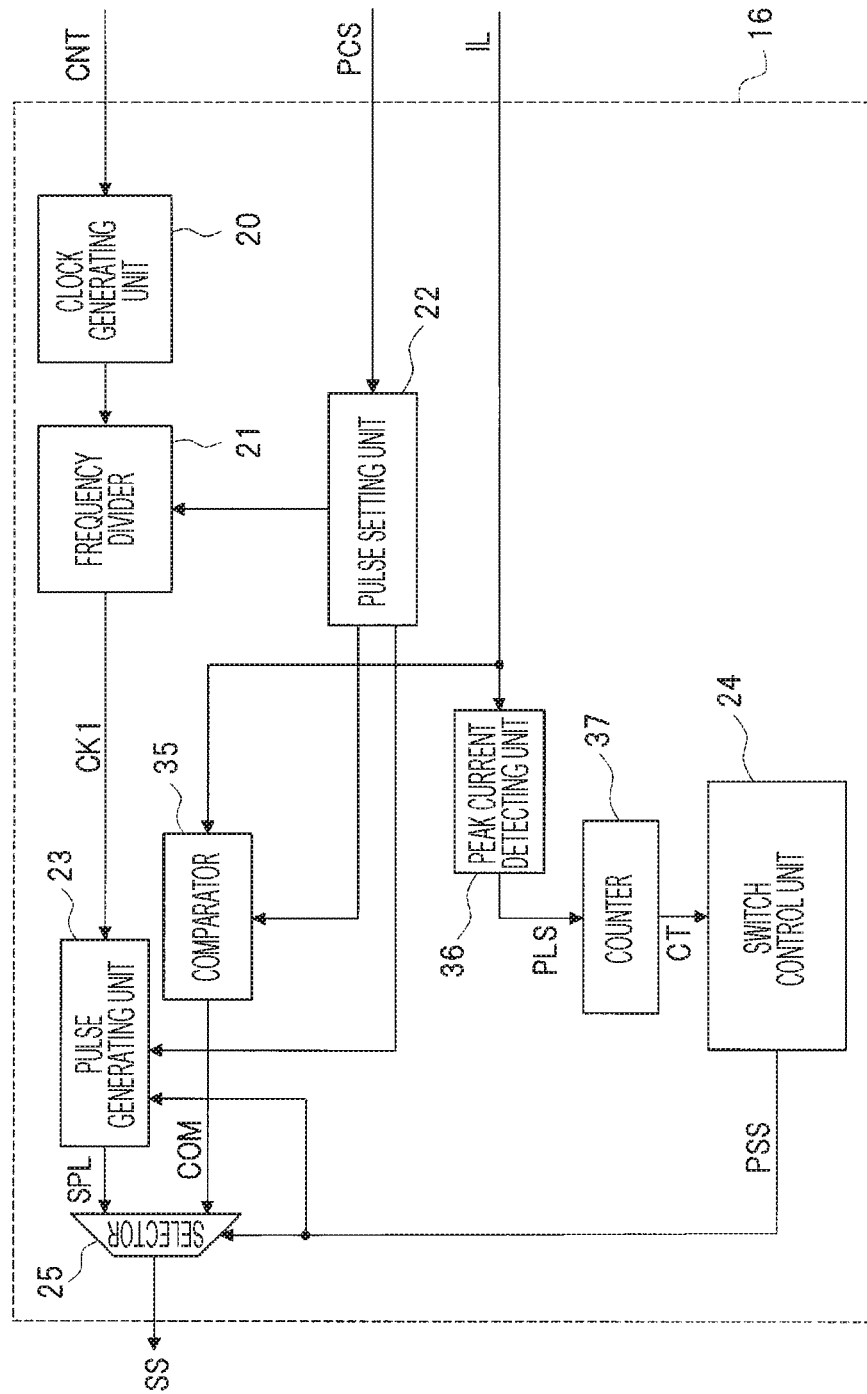
FIG. 7 is an explanatory drawing showing one example of the configuration of the current control unit provided in the boosting power supply unit of FIG. 6.

FIG. 7 is an explanatory drawing showing one example of the configuration of the current control unit 16 provided in the boosting power supply unit 10 of FIG. 6.

As shown in FIG. 7, the current control unit 16 is configured by newly adding a comparator 35, a peak current detecting unit 36 and a counter 37 to the configuration of the aforementioned Embodiment 1 of FIG. 2, which is composed of the clock generating unit 20, the frequency divider 21, the pulse setting unit 22, the pulse generating unit 23, the switch control unit 24 and the selector 25. Moreover, a switch setting control unit is configured by the switch control unit 24, the peak current detecting unit 36 and the counter 37.

To an input part of the comparator 35 and the peak current detecting unit 36, an inductor current IL measured by the current sensing circuit 30 is inputted. The comparator 35 compares the inductor current IL with a peak setting current value and outputs the comparison result as an output signal COM. More specifically, the output signal COM of a high signal is outputted when the inductor current IL becomes larger than the preset peak setting current value. The output signal COM of a low signal is outputted when the inductor current IL becomes smaller than the peak setting current value.

This peak setting current is set by the pulse setting unit 22. Moreover, the pulse setting unit 22 sets each of the frequency and the duty ratio of the clock signal CK1 of the frequency divider 21, an output cycle and an output period of the pulse signal SPL of the pulse generating unit 23, and the like.

Similar to the aforementioned Embodiment 1, these settings by the pulse setting unit 22 are set, for example, based on the pulse setting control signal PCS outputted from the CPU (not shown) or the like provided in the ECU.

The peak current detecting unit 36 generates a pulse signal PLS at each time the inductor current IL measured by the current sensing circuit 30 becomes a peak setting current value Ip. The counter 37 outputs a count signal CT of a high signal when a first pulse signal PLS generated by the peak current detecting unit 36 is inputted. Thereafter, the counter 37 counts the count number of the pulse signal PLS and outputs a count signal CT of a low signal when the count number reaches a preset count number. Moreover, the counter 37 resets the counter value when outputting the count signal CT of a low signal.

The switch control unit 24 outputs a pulse switching signal PSS to the selector 25 based on the count signal CT outputted from the counter 37. To an input part of the selector 25, each of the pulse signal SPL and the output signal COM, which are generated by the pulse generating unit 23 and the comparator 35 respectively, is inputted. The selector 25 outputs either the pulse signal SPL or the output signal COM as the switching signal SS based on the pulse switching signal PSS at an input part outputted from the switch control unit 24. Note that the connection configurations and the operations of the unmentioned frequency divider 21 and the clock generating unit 20 are the same as those in the aforementioned Embodiment 1 of FIG. 2.

<Operation Example of Current Control Unit>

Figure 8:
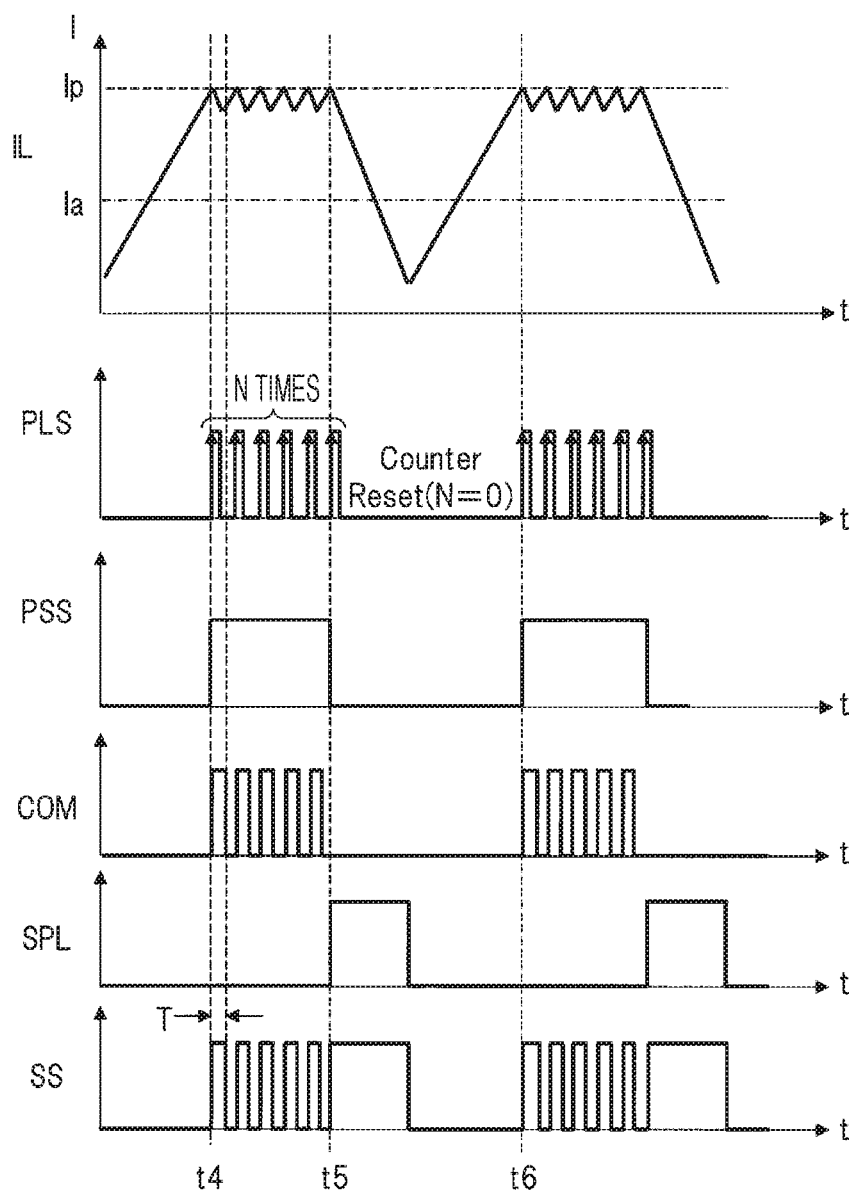
FIG. 8 is an explanatory drawing of signal timings showing one example of the operations in the current control unit of FIG. 7.

FIG. 8 is an explanatory drawing of signal timings showing one example of the operations in the current control unit 16 of FIG. 7.

From the top to the bottom, FIG. 8 severally shows the inductor current IL measured by the current sensing circuit 30, and signal timings of the pulse signal PLS outputted by the peak current detecting unit 36, the pulse switching signal PSS outputted by the switch control unit 24, the output signal COM outputted by the comparator 35, the pulse signal SPL outputted from the pulse generating unit 23 and the switching signal SS outputted from the selector 25.

First, the pulse switching signal PSS of a low signal is outputted from the switch control unit 24. This makes the selector 25 output the pulse signal SPL, generated by the pulse generating unit 23, as the switching signal SS.

At this time, a low signal is outputted as the switching signal SS since the pulse signal SPL is not outputted from the pulse generating unit 23. When the switching signal SS is a low signal, the switching element 12 of FIG. 6 turns off, and the inductor current IL rises.

The peak current detecting unit 36 outputs the pulse signal PLS when the peak current detecting unit 36 detects that the inductor current IL rises and becomes the peak setting current value Ip. The counter 37 outputs the count signal CT of a high signal when the first pulse signal PLS is inputted.

As a result, the switch control unit 24 outputs the output signal COM, outputted from the comparator 35, as the switching signal SS based on the count signal CT of a high signal (time t4). When the output signal COM, that is, the switching signal SS is a high signal (period T), the switching element 12 turns on, and the inductor current IL decreases.

The comparator 35 outputs the output signal COM of a high signal again when a current value of the inductor current IL becomes smaller than the peak setting current value Ip. By repeating these operations, the current value of the inductor current IL is clamped at around the peak setting current value Ip.

The peak current detecting unit 36 outputs the pulse signal PLS in accordance with a current value of the clamped inductor current IL. The counter 37 counts the inputted pulse signal PLS and outputs the count signal CT of a low signal to the switch control unit 24 when the count number reaches a set count value. Moreover, the counter 37 resets the counter value when outputting the count signal CT of a low signal.

The switch control unit 24 controls the selector 25 to switch the output thereof and output the pulse signal SPL outputted from the pulse generating unit 23 (time t5) when the count signal CT of a low signal is inputted.

At this time, the pulse signal SPL of a high signal is generated from the pulse generating unit 23, and the pulse signal SPL is outputted as the switching signal SS. When the switching signal SS is a high signal, the switching element 12 turns on, and the inductor current IL decreases.

Repeating the above operations clamps the peak current of the inductor current IL at the vicinity of the peak setting current value Ip.

By using the comparator 35 to control the current clamping of the inductor current IL in this manner, the current value upon the current clamping can be controlled with high precision to be substantially constant.

In addition to the effect of the above Embodiment 1, this can improve the stability of the high voltage power supply VBOOST generated by the boosting power supply unit 10.

Embodiment 3

<Configuration Example of Current Control Unit>

Figure 9:
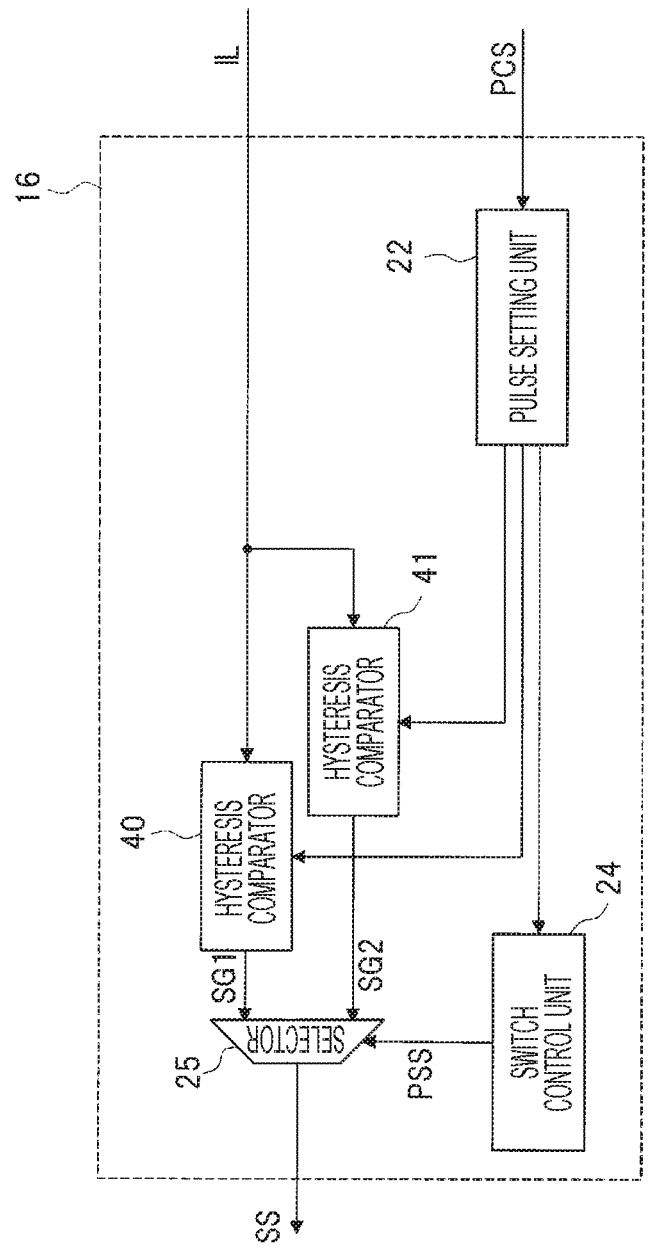
FIG. 9 is an explanatory drawing showing one example of the configuration of a current control unit according to Embodiment 3.

FIG. 9 is an explanatory drawing showing one example of the configuration of a current control unit 16 according to Embodiment 3. Note that the configuration of the boosting power supply unit 10, in which the current control unit 16 of FIG. 9 is provided, is the same as the one in the aforementioned Embodiment 2 of FIG. 6.

As shown in FIG. 9, the current control unit 16 has a pulse setting unit 22, a switch control unit 24, a selector 25 and hysteresis comparators 40 and 41. The pulse setting unit 22 performs the settings of the switch control unit 24 and the hysteresis comparators 40 and 41, for example, based on a pulse setting control signal PCS outputted from a CPU or the like (not shown) provided in an ECU.

More specifically, the settings include the duty ratio of the pulse switching signal PSS outputted by the switch control unit 24 and the undermentioned current threshold values Vth1 to Vth3 used in the hysteresis comparators 40 and 41.

The current threshold value Vth2 is a value lower than the current threshold value Vth1, and the current threshold value Vth3 is a value lower than the current threshold value Vth2.

The current threshold value Vth1 becomes a first threshold value, and the current threshold value Vth2 becomes a third threshold value. Moreover, the current threshold value Vth3 becomes a second threshold value.

The selector 25 outputs either the output signal SG1 of the hysteresis comparator 40 or the output signal SG2 of the hysteresis comparator 41 as a switching signal SS based on a pulse switching signal PSS outputted by the switch control unit 24.

The hysteresis comparator 40, a first signal generating unit, compares the current threshold values Vth1 and Vth3 with the inductor current IL measured by the current sensing circuit 30 shown in FIG. 6 and outputs the output signal SG1, the comparison result. This output signal SG1 becomes a first switching signal.

More specifically, the hysteresis comparator 40 outputs the output signal SG1 of a high signal when the inductor current IL measured by the current sensing circuit 30 becomes larger than the current threshold value Vth1. The hysteresis comparator 40 outputs a power signal SG1 of a low signal when the inductor current IL becomes smaller than the current threshold value Vth3.

The hysteresis comparator 41, a second signal generating unit, compares the current threshold values Vth1 and Vth2 with the inductor current IL measured by the current sensing circuit 30 shown in FIG. 6 and outputs the output signal SG2, the comparison result. The output signal SG2 becomes a second switching signal.

More specifically, the hysteresis comparator 41 outputs the output signal SG2 of a high signal when the inductor current IL measured by the current sensing circuit 30 becomes larger than the current threshold value Vth1. The hysteresis comparator 41 outputs a power signal SG2 of a low signal when the inductor current IL becomes smaller than the current threshold value Vth2.

<Operation Example of Current Control Unit>

Figure 10:
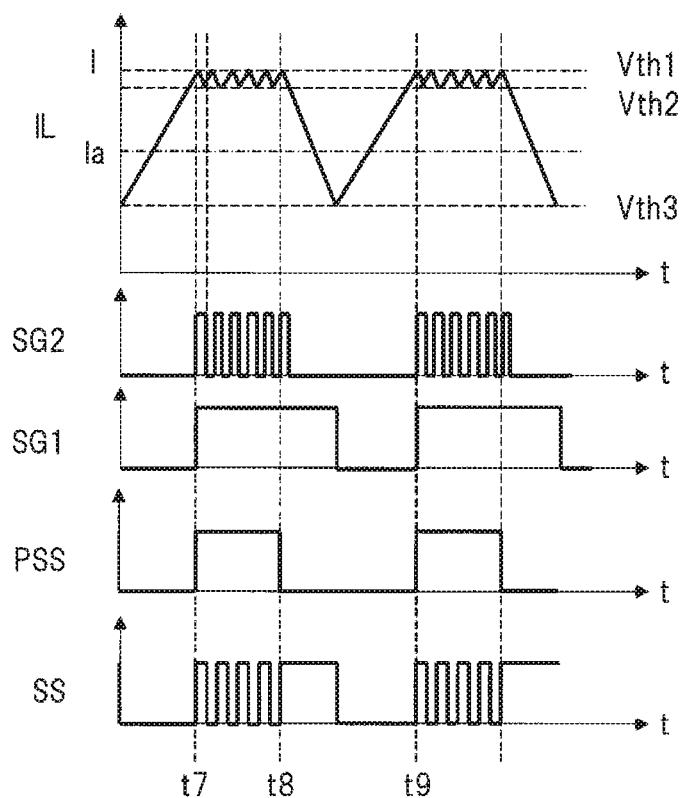
FIG. 10 is an explanatory drawing of signal timings showing one example of the operations in the current control unit of FIG. 9.

FIG. 10 is an explanatory drawing of signal timings showing one example of the operations in the current control unit 16 of FIG. 9.

From the top to the bottom, FIG. 10 severally shows the inductor current IL measured by the current sensing circuit 30, and signal timings of the output signal SG2 of the hysteresis comparator 41, the output signal SG1 of the hysteresis comparator 40, the pulse switching signal PSS outputted by the switch control unit 24 and the switching signal SS outputted from the selector 25.

First, at the signal rising of the pulse switching signal PSS outputted from the switch control unit 24 (time t7), the selector 25 selects the output signal SG2 outputted from the hysteresis comparator 41 and output the output signal SG2 as the switching signal SS.

Note that the pulse setting unit 22 performs the setting in the switch control unit 24 regarding the duty ratio of the pulse switching signal PSS based on the previously inputted pulse setting control signal PCS outputted from the CPU as preciously described.

In the hysteresis comparator 41, the output signal SG2 becomes a high signal when the inductor current IL becomes larger than the current threshold value Vth1, and the output signal SG2 becomes a low signal when the inductor current IL becomes smaller than the current threshold value Vth2. Thus, a pulse-like output signal SG2 outputted from the hysteresis comparator 41 is outputted during a period when the pulse switching signal PSS is a high signal.

Moreover, the current threshold value Vth1 and the current threshold value Vth2 are set as the peak setting currents of the boosting coil 11 shown in FIG. 6, and a difference between the current threshold value Vth1 and the current threshold value Vth2 is set to be small. This clamps the inductor current IL between the current threshold value Vth1 and the current threshold value Vth2.

Next, at the signal falling of the pulse switching signal PSS (time t8), the selector 25 selects the output signal SG1 outputted from the hysteresis comparator 40 and output the output signal SG1 as the switching signal SS when the pulse switching signal PSS becomes a low signal.

At this time, the output signal SG1 outputted from the hysteresis comparator 40 is a high signal since the inductor current IL is larger than the current threshold value Vth3. Thus, the switching element 12 of FIG. 6 turns on, and the inductor current IL decreases. Herein, the current threshold value Vth3 becomes the minimum current value of the inductor current IL.

Thereafter, when the inductor current IL decreases and becomes smaller than the current threshold value Vth3, the output signal SG1 of the hysteresis comparator 40 becomes a low signal, and the switching element 12 turns off. This increases the inductor current IL again.

Thereafter, the switch control unit 24 outputs the pulse switching signal PSS so that the selector 25 selects the output signal SG2 outputted from the hysteresis comparator 41 (time t9). Hereinafter, the same process will be repeated.

Because the peak current and minimum current flowing in the inductor current IL are set by the hysteresis comparators 40 and 41 in this manner, the peak current and the minimum current can be controlled with high precision to be substantially constant.

In addition to the effect of the above Embodiment 1, this can generate a more stable high voltage power supply VBOOST.

The invention achieved by the inventors has been specifically described herein based on the embodiments. However, it is needless to say that the present invention is not limited to the aforementioned embodiments and various changes can be made in the scope not departing from the gist thereof.

Note that the present invention is not limited to the above embodiments and includes various modifications. For example, the detailed description of the above embodiments has been made so that the present invention can be easily understood, and the present invention is not necessarily limited to the ones including all the configurations which have been described.

Moreover, part of the configuration of a certain embodiment can be replaced with the configuration of other embodiments, and the configuration of other embodiments can also be added to the configuration of the certain embodiment. Furthermore, addition, deletion and replacement of other configurations can be made to part of the configuration of each embodiment.

REFERENCE SIGNS LIST 10 boosting power supply unit
11 boosting coil
12 switching element
13 capacitor
14 diode
15 voltage control unit
16 current control unit
20 clock generating unit 21 frequency divider
22 pulse setting unit
23 pulse generating unit
24 switch control unit
25 selector
30 current sensing circuit
35 comparator
36 peak current detecting unit
37 counter
40 hysteresis comparator
41 hysteresis comparator
50 boosting power supply unit
51 current sensing circuit
52 boosting coil
53 switching element
54 diode
55 voltage control unit
56 current control unit
57 capacitor
BAT battery

The invention claimed is:

1. A power supply unit, comprising:
a switching element connected in parallel to a direct current power supply;
a boosting coil which boosts the direct current power supply by switching operation of the switching element; and
a current control unit which controls an inductor current flowing in the boosting coil by controlling the switching element to turn on and off by a first switching signal and a second switching signal with a higher frequency than the first switching signal,
wherein the current control unit controls the switching element to turn on and off by using the second switching signal in a clamping period when the inductor current flowing in the boosting coil is clamped at a preset peak setting current, and the current control unit controls the switching element to turn on and off by using the first switching signal in periods other than the clamping period.

2. The power supply unit according to claim 1, wherein the current control unit includes
a first signal generating unit which generates the first switching signal,
a second signal generating unit which generates the second switching signal,
a selector which outputs either the first switching signal generated by the first signal generating unit or the second switching signal generated by the second signal generating unit to the switching element based on a pulse switching signal, and
a switch control unit which generates the pulse switching signal outputted to the selector.

3. The power supply unit according to claim 2, wherein the current control unit further includes a pulse setting unit which sets at least one of a frequency and a duty ratio of the first switching signal generated by the first signal generating unit, based on a pulse setting control signal inputted from outside.

4. The power supply unit according to claim 3, wherein the pulse setting unit sets at least one of a frequency and a duty ratio of the second switching signal generated by the second signal generating unit, based on the pulse setting control signal.

5. The power supply unit according to claim 3, wherein the pulse setting unit sets each of an output period and an output timing of the pulse switching signal generated by the switch control unit, based on the pulse setting control signal.

6. The power supply unit according to claim 1, further comprising
a current measuring unit which measures the inductor current flowing in the boosting coil,
wherein the current control unit includes a first signal generating unit which generates the first switching signal,
a second signal generating unit which generates the second switching signal,
a selector which outputs either the first switching signal generated by the first signal generating unit or the second switching signal generated by the second signal generating unit to the switching element based on a pulse switching signal, and
a switch setting control unit which generates the pulse switching signal outputted to the selector, and
the second signal generating unit compares the inductor current measured by the current measuring unit with the peak setting current and outputs a comparison result thereof.

7. The power supply unit according to claim 6, wherein the switch setting control unit includes
a peak current detecting unit which outputs a pulse signal at each time the inductor current measured by the current measuring unit becomes the peak setting current,
a counter which counts the pulse signal outputted from the peak current detecting unit and outputs a count signal based on a count number, and
a switch control unit which outputs the pulse switching signal based on the count signal outputted by the counter, and
the counter outputs the count signal during a period from when the pulse signal of the peak current detecting unit is inputted to that the count number of the pulse signal reaches a set value.

8. The power supply unit according to claim 7, wherein the current control unit further includes a pulse setting unit which sets the peak setting current compared by the second signal generating unit, based on a pulse setting control signal inputted from outside.

9. The power supply unit according to claim 8, wherein the pulse setting unit further sets at least one of a frequency or a duty ratio of the first switching signal generated by the first signal generating unit, based on the pulse setting control signal.

10. The power supply unit according to claim 1, further comprising
a current measuring unit which measures the inductor current flowing in the boosting coil,
wherein the current control unit includes a first signal generating unit which generates the first switching signal,
a second signal generating unit which generates the second switching signal,
a selector which outputs either the first switching signal generated by the first signal generating unit or the second switching signal generated by the second signal generating unit to the switching element based on a pulse switching signal, and
a switch setting control unit which generates the pulse switching signal outputted to the selector, the first signal generating unit outputs a first signal when the inductor current measured by the current measuring unit becomes larger than a first threshold value, and outputs a second signal, an inversion signal of the first signal, when the inductor current becomes smaller than a second threshold value thereby setting a period between a low signal and a high signal of the first switching signal, and the second signal generating unit outputs a third signal when the inductor current becomes larger than the first threshold value, and outputs a fourth signal, an inversion signal of the third signal, when the inductor current becomes smaller than a third threshold value thereby setting a period between a low signal and a high signal of the second switching signal.

11. The power supply unit according to claim 10, wherein the first threshold value and the third threshold value set the peak setting current, and
the second threshold value sets a minimum current of the inductor current.

12. The power supply unit according to claim 10, wherein the current control unit further includes a pulse setting unit which sets the first and the second threshold values set in the first signal generating unit, based on a pulse setting control signal inputted from outside.

13. The power supply unit according to claim 12, wherein the pulse setting unit sets the first and the third threshold values set in the second signal generating unit, based on the pulse setting control signal.

14. The power supply unit according to claim 10, wherein the first signal generating unit and the second signal generating unit are hysteresis comparators.

* * * * *